United States Patent
Zhang et al.

(10) Patent No.: US 12,542,279 B2
(45) Date of Patent: Feb. 3, 2026

(54) POSITIVE ELECTRODE SLURRY, POSITIVE ELECTRODE PLATE, LITHIUM-ION BATTERY, BATTERY MODULE, BATTERY PACK, AND ELECTRICAL DEVICE

(71) Applicant: CONTEMPORARY AMPEREX TECHNOLOGY (HONG KONG) LIMITED, Hong Kong (CN)

(72) Inventors: Qianqian Zhang, Ningde (CN); Yanjie Zhao, Ningde (CN); Xing Li, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 530 days.

(21) Appl. No.: 18/069,975

(22) Filed: Dec. 21, 2022

(65) Prior Publication Data
US 2023/0138600 A1    May 4, 2023

Related U.S. Application Data

(63) Continuation of application No. PCT/CN2021/128404, filed on Nov. 3, 2021.

(51) Int. Cl.
*H01M 4/62* (2006.01)
*H01M 4/02* (2006.01)
(Continued)

(52) U.S. Cl.
CPC ........... *H01M 4/62* (2013.01); *H01M 4/0404* (2013.01); *H01M 4/485* (2013.01); *H01M 4/505* (2013.01);
(Continued)

(58) Field of Classification Search
CPC ...... H01M 4/62; H01M 4/0404; H01M 4/485; H01M 4/505; H01M 4/525; H01M 4/622;
(Continued)

(56) References Cited

U.S. PATENT DOCUMENTS

2017/0365882 A1    12/2017 Luski et al.

FOREIGN PATENT DOCUMENTS

| CN | 101705245 A | 5/2010 |
|----|-------------|--------|
| CN | 103204882 A | 7/2013 |

(Continued)

OTHER PUBLICATIONS

The World Intellectual Property Organization (WIPO) International Search Report for PCT/CN2021/128404 Aug. 3, 2022 6 pages (with translation).
(Continued)

*Primary Examiner* — Daniel S Gatewood
(74) *Attorney, Agent, or Firm* — ANOVA LAW GROUP, PLLC

(57) ABSTRACT

A positive electrode slurry includes a manganese-containing positive active material and a positive electrode additive. The positive electrode additive includes a compound repre-
(Continued)

sented by Formula (I), where A and B are same and are any one selected from atoms N, O, and S, and $R_1$, $R_2$, $R_3$, $R_4$, $R_5$, $R_6$, $R_7$, and $R_8$ are, each independently, selected from hydrogen or an alkyl with a carbon number of 1-7.

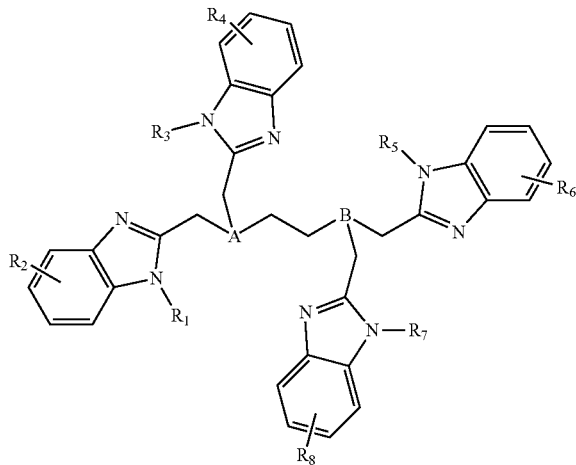

Formula (I)

15 Claims, 7 Drawing Sheets

(51) Int. Cl.
*H01M 4/04* (2006.01)
*H01M 4/485* (2010.01)
*H01M 4/505* (2010.01)
*H01M 4/525* (2010.01)
*H01M 10/0525* (2010.01)

(52) U.S. Cl.
CPC ............ *H01M 4/525* (2013.01); *H01M 4/622* (2013.01); *H01M 4/625* (2013.01); *H01M 10/0525* (2013.01); *H01M 2004/028* (2013.01)

(58) Field of Classification Search
CPC ............ H01M 4/625; H01M 10/0525; H01M 2004/028; H01M 4/131; H01M 10/4235; Y02E 60/10
See application file for complete search history.

(56) References Cited

FOREIGN PATENT DOCUMENTS

| CN | 107615522 | A |   | 1/2018 |   |
|---|---|---|---|---|---|
| CN | 110323393 | A |   | 10/2019 |   |
| CN | 111129460 | A | * | 5/2020 | ............ H01M 4/505 |
| JP | 2010118320 | A |   | 5/2010 |   |
| JP | 2012089411 | A | * | 5/2012 |   |
| JP | 2012115759 | A | * | 6/2012 |   |

OTHER PUBLICATIONS

The European Patent Office (EPO) The Extended European Search Report for Application No. 21943315.8 Jul. 1, 2024 10 Pages.
Zhan-Ru Liao et al. "Synthesis, characterization and SOD-like activities of manganese-containing complexes with N, N', N", N"'-tetrakis(2"-benzimidazolyl methyl)-1, 2-ethanediamine (EDTB)." Polyhedron 20.22-23 (2001): 2813-2821.

* cited by examiner

POSITIVE ELECTRODE SLURRY, POSITIVE ELECTRODE PLATE, LITHIUM-ION BATTERY, BATTERY MODULE, BATTERY PACK, AND ELECTRICAL DEVICE

CROSS-REFERENCE TO RELATED APPLICATION

This application is a continuation of International Application No. PCT/CN2021/128404, filed on Nov. 3, 2021, the entire content of which is incorporated herein by reference.

TECHNICAL FIELD

This application relates to the technical field of lithium batteries, and in particular, to a positive electrode slurry, a positive electrode plate containing same, a lithium-ion battery, a battery module, a battery pack, and an electrical device.

BACKGROUND

In recent years, lithium-ion batteries have been applied wider in many fields, including energy storage power systems such as hydro, thermal, wind, and solar power stations, and other fields such as electric tools, electric bicycles, electric motorcycles, and electric vehicles, military equipment, and aerospace. The great development of the lithium-ion batteries gives rise to higher requirements on the energy density, cycle performance, safety performance, and other performance of the batteries.

The operating voltage and energy density of a lithium-ion battery largely depend on a positive electrode material. Lithium manganese oxide (such as spinel lithium manganese oxide $LiMn_2O_4$) is considered to be an ideal positive electrode material for a lithium-ion power battery by virtue of high availability, a high energy density, cost-effectiveness, no pollution, high safety, and the like. However, the capacity of lithium-manganese-oxide-based lithium-ion batteries fades rapidly, especially under high-temperature conditions, thereby having been a bottleneck for large-scale application thereof all the time. Dissolution of manganese in an electrolytic solution is considered to be a main reason for the capacity fading of the lithium manganese oxide as a positive electrode material. To suppress the capacity fading, people adopts the method of multi-element doping and surface coating. However, this merely alleviates the dissolution of manganese partly, and is unable to more effectively suppress precipitation of manganese and slow down the capacity fading of the battery. Therefore, it is necessary to further develop an effectively regulating material or method to prolong the service life of the lithium-manganese-oxide-based lithium-ion batteries and improve the high-temperature cycle performance and high-temperature storage performance of the batteries.

SUMMARY

This application is put forward in view of the foregoing problems, and aims to provide a positive electrode slurry capable of effectively improving a service life, high-temperature cycle performance, and high-temperature storage performance of a lithium-manganese-oxide-based lithium-ion battery, and to provide a positive electrode plate containing the slurry according to this application, a lithium-ion battery, a battery module, a battery pack, and an electrical device.

To fulfill the foregoing objective, this application provides a positive electrode slurry, including: a manganese-containing positive active material, and a positive electrode additive.

The positive electrode additive is a compound represented by Formula (I):

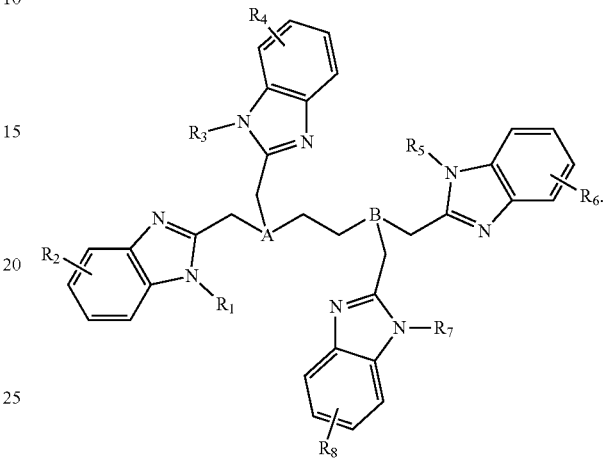

Formula (I)

In the formula above, A and B are same and are any one selected from atoms N, O, and S.

$R_1, R_2, R_3, R_4, R_5, R_6, R_7$, and $R_8$ are, each independently, selected from hydrogen or an alkyl with a carbon number of 1-7.

Therefore, the positive electrode slurry according to this application can significantly reduce deposition of manganese ions on the surface of a negative electrode material by effectively capturing the manganese ions, thereby slowing down capacity fading of a lithium-manganese-oxide-based lithium-ion battery during cycling and storage, and improving the service life, high-temperature cycle performance, and high-temperature storage performance of the battery.

In any embodiment, in the positive electrode additive represented by Formula (I), $R_1, R_2, R_3, R_4, R_5, R_6, R_7$, and $R_8$ are, each independently, selected from hydrogen or an alkyl with a carbon number of 1-3, and A and B are N atoms.

In any embodiment, the positive electrode additive is N,N,N',N'-tetrakis-[(2-benzimidazolyl)methyl]-1,2-ethanediamine (EDTB).

In any embodiment, a weight percentage of the positive electrode additive is 0.06 wt % to 1.5 wt %, and in some embodiments 0.5 wt % to 1 wt % based on a total weight of the positive electrode slurry.

In any embodiment, a weight ratio between the manganese-containing positive active material and the positive electrode additive is 40:1 to 1000:1, and in some embodiments 60:1 to 200:1.

In any embodiment, the manganese-containing positive active material is at least one selected from lithium manganese oxide, lithium manganese cobalt oxide, lithium aluminum manganese oxide, lithium nickel manganese oxide, lithium nickel cobalt manganese oxide, or a modified compound thereof, and a weight percentage of the manganese-containing positive active material is 50 wt % to 75 wt % based on a total weight of the positive electrode slurry.

In any embodiment, the positive electrode slurry includes a binder, the binder is at least one selected from styrene, acrylate, vinyl acetate, fatty acid vinyl ester, epoxy resin, linear polyester, polyvinylidene fluoride, polystyrene, polysulfide rubber, polyacrylic acid, polyacrylate, polyurethane, polyisobutylene, polyvinyl alcohol, polyimide, polyacrylonitrile, polyethylene oxide, polyvinylpyrrolidone, styrene butadiene rubber, or gelatin, and a weight percentage of the binder is 0.5 wt % to 1 wt % based on a total weight of the positive electrode slurry.

In any embodiment, the positive electrode slurry includes a conductive agent, the conductive agent is at least one selected from superconductive carbon, acetylene black, carbon black, Ketjen black, carbon dots, carbon nanotubes, graphene, or carbon nanofibers, and a weight percentage of the conductive agent is 0.9 wt % to 1.5 wt % based on a total weight of the positive electrode slurry.

In any embodiment, the positive electrode slurry further includes a dispersant, and the dispersant is at least one selected from polymethyl methacrylate, polyethylene glycol, polyvinylpyrrolidone, sodium linear alkylbenzene sulfonate, alkyl polyoxyethylene ether, sodium lauryl sulfate, or alkyl sulfonate, and a weight percentage of the dispersant is 0.05 wt % to 0.1 wt % based on a total weight of the positive electrode slurry.

A second aspect of this application further provides a positive electrode plate, including a positive current collector and a positive film layer disposed on at least one surface of the positive current collector. The positive film layer contains the positive electrode slurry according to any one of the foregoing implementation solutions.

A third aspect of this application provides a lithium-ion battery, including a positive electrode on which a positive film layer contains the positive electrode slurry according to any one of the foregoing implementation solutions.

The lithium-ion battery according to this application includes the positive electrode containing the foregoing positive electrode slurry, and therefore, is improved in terms of service life, high-temperature cycle performance, and high-temperature storage performance.

A fourth aspect of this application provides a battery module, including the lithium-ion battery according to the third aspect of this application.

A fifth aspect of this application provides a battery pack, including the battery module according to the fourth aspect of this application.

A sixth aspect of this application provides an electrical device, including at least one of the lithium-ion battery according to the third aspect of this application, the battery module according to the fourth aspect of this application, or the battery pack according to the fifth aspect of this application.

The battery module, the battery pack, and the electrical device according to this application each contain the lithium-ion battery according to this application, and therefore, have at least the same advantages as the lithium-ion battery.

REFERENCE NUMERALS

Figure 1:
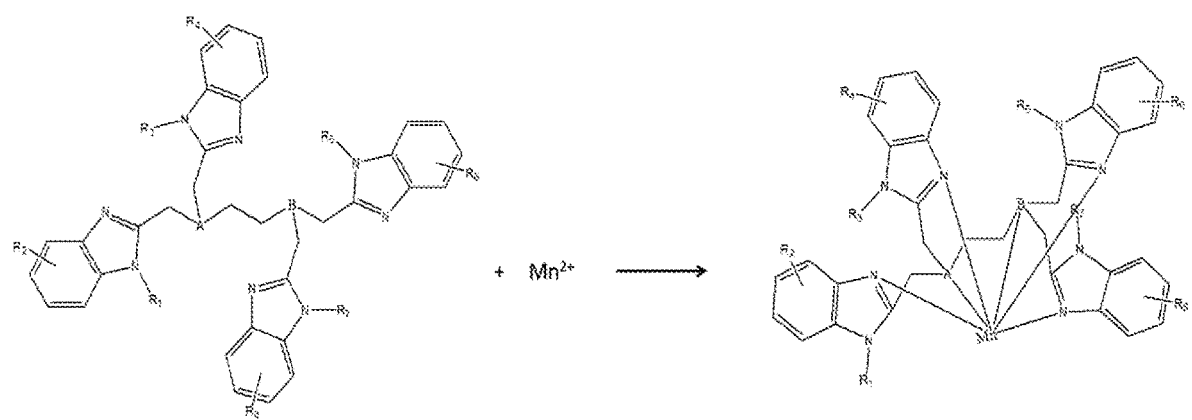
FIG. 1 is a schematic diagram of a positive electrode additive coordinated to manganese to form a complex according to an embodiment of this application.

1. battery pack; 2. upper box; 3. lower box; 4. battery module; 5. lithium-ion battery; 51. housing; 52. electrode assembly; 53. top cap assembly.

DETAILED DESCRIPTION OF EMBODIMENTS

The following describes in detail a positive electrode slurry, a positive electrode plate, a lithium-ion battery, a battery module, a battery pack, and an electrical device according to this application with due reference to drawings. However, unnecessary details may be omitted in some cases. For example, a detailed description of a well-known matter or repeated description of a substantially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by selecting a lower limit and an upper limit. The selected lower and upper limits define the boundaries of the given range. A range so defined may be inclusive or exclusive of the end values, and may be arbitrarily combined. That is, any lower limit may be combined with any upper limit to form a range. For example, if a range of 60 to 120 and a range of 80 to 110 are listed for a given parameter, it is expectable that such ranges may be understood as 60 to 110 and 80 to 120. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, the numerical range "0 to 5" means that all real numbers between 0 and 5 inclusive are listed herein, and the range "0 to 5" is just a brief representation of combinations of such numbers. In addition, when a parameter is expressed as an integer greater than or equal to 2, the expression is equivalent to that the parameter is an integer such as 2, 3, 4, 5, 6, 7, 8, 9, 10, 11, 12, and so on.

Unless otherwise expressly specified herein, all embodiments and optional embodiments hereof may be combined with each other to form a new technical solution.

Unless otherwise expressly specified herein, all technical features and optional technical features hereof may be combined with each other to form a new technical solution.

Unless otherwise expressly specified herein, all steps described herein may be performed in sequence or at random, and in some embodiments in sequence. For example, that the method includes steps (a) and (b) indicates that the method may include steps (a) and (b) performed in sequence, or steps (b) and (a) performed in sequence. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion. For example, the terms "include" and "comprise" may mean inclusion of other items that are not set out.

Unless otherwise expressly specified herein, the term "or" is inclusive. For example, the phrase "A or B" means "A alone, B alone, or both A and B." More specifically, any one of the following conditions falls within the condition "A or B": A is true (or existent) and B is false (or absent); A is false (or absent) and B is true (or existent); and, both A and B are true (or existent).

The capacity of lithium manganese oxides (such as spinel lithium manganese oxide $LiMn_2O_4$) fades rapidly during a charge-and-discharge cycle, especially at a high temperature (above 55° C.), thereby severely hindering the application of the lithium manganese oxides as a positive electrode material of lithium ion batteries. It is now generally accepted that the capacity fading of the lithium manganese oxides during cycles is mainly caused by $Mn^{3+}$. Using the spinel lithium manganese oxide $LiMn_2O_4$ as an example, during an electrochemical cycle, $Mn^{3+}$ in $LiMn_2O_4$ interacts with an electrolytic solution. $Mn^{3+}$ undergoes disproportionation reaction to generate $Mn^{4+}$ and $Mn^{2+}$. $Mn^{2+}$ dissolves in the electrolytic solution. At a high temperature, a dissolution speed of $Mn^{2+}$ increases. On the one hand, the dissolution of manganese destroys the structure of $LiMn_2O_4$, resulting in the loss of the positive active material $LiMn_2O_4$. With the increase of a percentage of $Mn^{4+}$ on the surface of $LiMn_2O_4$, a charge transfer ability of the positive electrode material $LiMn_2O_4$ declines, and a surface resistance increases, making it more difficult to deintercalate lithium ions and resulting in rapid fading of the capacity. On the other hand, $Mn^{3+}$ dissolves to produce dissolved $Mn^{2+}$ that can migrate to a negative electrode and that is reduced on the lithiated graphite negative electrode and deposited on the negative electrode in the form of solid-state Mn. The $Mn^{2+}$ further reacts with a decomposition product of the electrolytic solution to form a fluoride or oxide. The fluoride or oxide is deposited on the surface of the electrode, resulting in an increase in an impedance of the electrode, blocking a diffusion channel of lithium ions, and leading to capacity fading. Such continuous dissolution of manganese ions severely damages reversibility of the negative electrode, deteriorates the resistance and gassing of the battery, accelerates the fading of the capacity, and ultimately leads to a decline in the battery life. In addition, the manganese accumulated on the negative electrode forms a thicker passivation film (also known as a solid electrolyte interface (SEI) film) by consuming more active lithium ions, thereby resulting in rapid fading of the capacity and deteriorating the cycle performance and storage performance of the battery.

A main countermeasure currently available against the dissolution-deposition process of manganese in the lithium-manganese oxide-based lithium-ion battery is to modify the positive electrode lithium manganese oxide by surface coating and bulk doping, so as to achieve the effect of suppressing the dissolution of manganese. However, active cations directly used in the bulk doping, such as Ni and Co, usually brings safety and cost problems. The active cations such as Al and Ti used in the bulk doping may lead to first-cycle capacity loss. The surface coating method forms a new interface layer, and results in an increase in the lithium ion transfer resistance. In addition, the modified lithium manganese oxide is unable to achieve the effect of completely suppressing the dissolution of manganese. Therefore, a material that achieves the following effects needs to be used in the battery: enabling the dissolved manganese ions to reach a stable state to change a deposition reaction equilibrium, so as to suppress the dissolution of manganese ions and reduce the deposition of manganese on the surface of the negative electrode. This protects the negative electrode from being poisoned and avoids a resulting decline in the capacity and service life, thereby extending the service life of the lithium-manganese-oxide-based lithium-ion battery, and improving the high-temperature cycle performance and high-temperature storage performance of the battery.

The positive electrode slurry according to this application is applicable to, for example, a lithium-ion battery.

Specifically, a first aspect of this application discloses a positive electrode slurry, including: a manganese-containing positive active material, and a positive electrode additive.

The positive electrode additive is a compound represented by Formula (I):

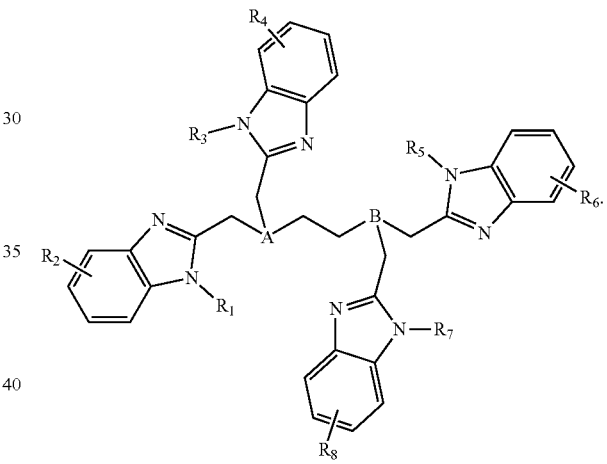

Formula (I)

In the formula above, A and B are same and are any one selected from atoms N, O, and S.

$R_1$, $R_2$, $R_3$, $R_4$, $R_5$, $R_6$, $R_7$, and $R_8$ are, each independently, selected from hydrogen or an alkyl with a carbon number of 1-7. Carbon number means the number of carbon atoms in a molecule or a group. For example, an alkyl with a carbon number of 7 means that the alkyl group has 7 carbon atoms.

In this application, manganese ions are "anchored" in the positive electrode material by using a complex (as shown in FIG. 1) formed from a positive electrode additive and the manganese ions. This reduces the number of manganese ions migrating to the negative electrode, and reduces the capacity loss caused by the consumption of active lithium used by the transition metal manganese to form a passivation film (also known as solid electrolyte interface (SEI) film) on the surface of the negative electrode, thereby improving the lifespan of the lithium-ion battery and improving the high-temperature cycle performance and high-temperature storage performance of the battery.

In some embodiments, A and B represent the same type of atom, brings the advantages of a stable structure and high availability from synthesis. In some embodiments, A and B each may be an N atom because the N atom, with a lone pair electrons, is more capable of coordinating with a metal and can easily form a thermodynamically stable complex.

Optionally, in the positive electrode additive represented by Formula (I), $R_1$, $R_2$, $R_3$, $R_4$, $R_5$, $R_6$, $R_7$, and $R_8$ are, each independently, selected from hydrogen or an alkyl with a carbon number of 1-3, and A and B are N atoms.

The alkyl with a carbon number of 1-7 may be a linear or branched alkyl group with 1 to 7 carbon atoms, for example, methyl, ethyl, propyl, isopropyl, butyl, isobutyl, or pentyl.

The alkyl with a carbon number of 1-7 may be, for example, methyl, ethyl, propyl, or isopropyl.

Optionally, the positive electrode additive is N,N,N',N'-tetrakis-[(2-benzimidazolyl)methyl]-1,2-ethanediamine (EDTB). The additive is an N-containing multidentate ligand, and is prone to coordinate with manganese to form a stable complex, so that the dissolved manganese ions are "anchored" on the surface of the positive electrode, thereby reducing deposition of the manganese ions on the surface of the negative electrode material.

Optionally, a weight percentage of the positive electrode additive is 0.06 wt % to 1.5 wt %, and in some embodiments 0.5 wt % to 1 wt % based on a total weight of the positive electrode slurry. If the weight percentage of the positive electrode additive is deficient, the unanchored manganese ions tend to migrate to the negative electrode and deposit on the surface of the negative electrode, resulting in poisoning of the negative electrode and in turn, a decline in the capacity and service life. If the weight percentage of the positive electrode additive is excessive, the excessive additive does not help to further anchor the manganese ions, but excessively occupies the weight percentage of the positive electrode slurry, thereby reducing the energy density of the battery.

Optionally, a weight ratio between the manganese-containing positive active material and the positive electrode additive is 40:1 to 1000:1, and in some embodiments 60:1 to 200:1. If the weight ratio is deficient, the weight percentage of the positive electrode additive is higher than the required value, thereby reducing the energy density of the battery. If the weight ratio is excessive, the weight percentage of the additive is deficient, and fails to greatly reduce the dissolution of manganese on the positive electrode.

Optionally, the manganese-containing positive active material is at least one selected from lithium manganese oxide (such as $LiMnO_2$ and $LiMn_2O_4$), lithium manganese cobalt oxide, lithium aluminum manganese oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.8}Co_{0.1}Mn_{0.1}O_2$ (briefly referred to as NCM811)), or a modified compound thereof. A weight percentage of the manganese-containing positive active material is 50 wt % to 75 wt % based on the total weight of the positive electrode slurry. One of the positive active materials may be used alone, or at least two thereof may be combined and used together. If the weight percentage of the positive active material is deficient, the solid content of the positive electrode slurry is deficient, and it is difficult to dry the electrode plate subsequently. If the weight percentage of the positive active material is excessive, the viscosity and stability of the slurry are difficult to control.

Optionally, the positive electrode slurry includes a binder, the binder is at least one selected from styrene, acrylate, vinyl acetate, fatty acid vinyl ester, epoxy resin, linear polyester, polyvinylidene fluoride, polystyrene, polysulfide rubber, polyacrylic acid, polyacrylate, polyurethane, polyisobutylene, polyvinyl alcohol, polyimide, polyacrylonitrile, polyethylene oxide, polyvinylpyrrolidone, styrene butadiene rubber, or gelatin. A weight percentage of the binder is 0.5 wt % to 1 wt % based on the total weight of the positive electrode slurry. If the weight percentage of the binder is deficient, the stability of the positive electrode slurry and the structural stability of the positive electrode plate are relatively low, and the cycle performance of the battery is relatively low. If the weight percentage of the binder is excessive, the stability of the positive electrode slurry is difficult to control, and the energy density of the battery is reduced.

Optionally, the positive electrode slurry includes a conductive agent. The conductive agent is at least one selected from superconductive carbon, acetylene black, carbon black, Ketjen black, carbon dots, carbon nanotubes, graphene, or carbon nanofibers. A weight percentage of the conductive agent is 0.9 wt % to 1.5 wt % based on the total weight of the positive electrode slurry. If the weight percentage of the conductive agent is deficient, the film resistance of the positive electrode plate is excessive. If the weight percentage of the conductive agent is excessive, the positive electrode slurry may agglomerate, thereby impairing the performance of the battery.

Optionally, the positive electrode slurry further includes a dispersant. The dispersant is at least one selected from polymethyl methacrylate, polyethylene glycol, polyvinylpyrrolidone, sodium linear alkylbenzene sulfonate, alkyl polyoxyethylene ether, sodium lauryl sulfate, or alkyl sulfonate. A weight percentage of the dispersant is 0.05 wt % to 0.1 wt % based on the total weight of the positive electrode slurry. If the weight percentage of the dispersant is deficient, the stirring uniformity of the positive electrode slurry is impaired. If the weight percentage of the dispersant is excessive, the weight percentage of other components is lower, and the overall performance of the positive electrode slurry is impaired, resulting in an unstable structure of the positive electrode slurry and inferior cycle performance of the battery.

Optionally, the positive electrode slurry further includes a solvent. The solvent is N-methyl-pyrrolidone. A weight percentage of the solvent is 20 wt % to 48 wt %. If the weight percentage of the solvent is deficient, the dispersibility of the positive electrode slurry is relatively low. If the weight percentage of the solvent is excessive, the process of drying the electrode plate is difficult to control, and the battery performance is impaired.

A second aspect of this application provides a positive electrode plate. The positive electrode plate includes a positive current collector and a positive film layer disposed on at least one surface of the positive current collector. The positive film layer includes the positive electrode slurry according to the first aspect of this application.

A third aspect of this application provides a lithium-ion battery. The lithium-ion battery includes the positive electrode slurry according to the first aspect of this application or the positive electrode plate according to the second aspect of this application.

Generally, the lithium-ion battery includes a positive electrode plate, a negative electrode plate, an electrolyte, and a separator. In a charge-and-discharge cycle of the battery, active ions are shuttled between the positive electrode plate and the negative electrode plate by intercalation and deintercalation. The electrolyte serves to conduct ions between the positive electrode plate and the negative electrode plate. Located between the positive electrode plate and the negative electrode plate, the separator mainly serves to prevent a short circuit between the positive electrode plate and the negative electrode plate, and is penetrable to ions.

A lithium-ion battery, a battery module, a battery pack, and an electrical device according to this application are described below with reference to drawings.

Positive Electrode Plate

The positive electrode plate includes a positive current collector and a positive film layer that overlays at least one surface of the positive current collector. The positive film layer includes a positive active material according to the first aspect of this application.

As an example, the positive current collector includes two surfaces opposite to each other in a thickness direction thereof. The positive film layer is disposed on either or both of the two opposite surfaces of the positive current collector.

In some embodiments, the positive current collector may be a metal foil or a composite current collector. For example, the metal foil may be an aluminum foil. The composite current collector may include a polymer material substrate and a metal layer formed on at least one surface of the polymer material substrate. The composite current collector may be formed by overlaying a polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the positive active material may be a manganese-containing positive active material that is well known in the art for use in a battery. As an example, the manganese-containing positive active material is at least one selected from lithium manganese oxide (such as $LiMnO_2$ and $LiMn_2O_4$), lithium manganese cobalt oxide, lithium aluminum manganese oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.5}Co_{0.1}Mn_{0.1}O_2$ (briefly referred to as NCM811)), or a modified compound thereof. One of the positive active materials may be used alone, or at least two thereof may be combined and used together.

In some embodiments, the positive film layer further optionally includes a binder. As an example, the binder may include at least one of styrene, acrylate, vinyl acetate, fatty acid vinyl ester, epoxy resin, linear polyester, polyvinylidene fluoride, polystyrene, polysulfide rubber, polyacrylic acid, polyacrylate, polyurethane, polyisobutylene, polyvinyl alcohol, polyimide, polyacrylonitrile, polyethylene oxide, polyvinylpyrrolidone, styrene butadiene rubber, or gelatin.

In some embodiments, the positive film layer further optionally includes a conductive agent. As an example, the conductive agent may include at least one of superconductive carbon, acetylene black, carbon black, Ketjen black, carbon dots, carbon nanotubes, graphene, or carbon nanofibers.

In some embodiments, the positive electrode plate may be prepared according to the following method: dispersing the ingredients of the positive electrode plate such as the positive active material, the conductive agent, and the binder and any other ingredients in a solvent (such as N-methylpyrrolidone) to form a positive electrode slurry, coating a positive current collector with the positive electrode slurry, and performing steps such as drying and cold pressing to obtain the positive electrode plate.

Negative Electrode Plate

The negative electrode plate includes a negative current collector and a negative film layer disposed on at least one surface of the negative current collector. The negative film layer includes a negative active material.

As an example, the negative current collector includes two surfaces opposite to each other in a thickness direction thereof. The negative film layer is disposed on either or both of the two opposite surfaces of the negative current collector.

In some embodiments, the negative current collector may be a metal foil or a composite current collector. For example, the metal foil may be a copper foil. The composite current collector may include a polymer material substrate and a metal layer formed on at least one surface of the polymer material substrate. The composite current collector may be formed by overlaying a polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the negative active material may be a negative active material that is well known in the art for use in a battery. As an example, the negative active material may include at least one of the following materials: artificial graphite, natural graphite, soft carbon, hard carbon, silicon-based material, tin-based material, lithium titanium oxide, and the like. The silicon-based material may be at least one selected from simple-substance silicon, silicon-oxygen compound, silicon-carbon composite, silicon-nitrogen composite, or silicon alloy. The tin-based material may be at least one selected from simple-substance tin, tin-oxygen compound, or tin alloy. However, this application is not limited to such materials, and other conventional materials usable as a negative active material of a battery may be used instead. One of the negative active materials may be used alone, or at least two thereof may be used in combination.

In some embodiments, the negative film layer further optionally includes a binder. The binder may be at least one selected from styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), and carboxymethyl chitosan (CMCS).

In some embodiments, the negative film layer further optionally includes a conductive agent. The conductive agent may be at least one selected from superconductive carbon, acetylene black, carbon black, Ketjen black, carbon dots, carbon nanotubes, graphene, or carbon nanofibers.

In some embodiments, the negative film layer further optionally includes other agents, such as a thickener (for example, sodium carboxymethyl cellulose (CMC-Na)).

In some embodiments, the negative electrode plate may be prepared according to the following method: dispersing the ingredients of the negative electrode plate such as the negative active material, the conductive agent, and the binder and any other ingredients in a solvent (such as deionized water) to form a negative slurry, coating a negative current collector with the negative slurry, and performing steps such as drying and cold pressing to obtain the negative electrode plate.

Electrolyte

The electrolyte serves to conduct ions between the positive electrode plate and the negative electrode plate. The type of the electrolyte is not particularly limited in this application, and may be selected as required. For example, the electrolyte may be in liquid- or gel-state, or all solid-state.

In some embodiments, the electrolyte is an electrolytic solution. The electrolytic solution includes an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro (oxalato) borate, lithium bis(oxalato) borate, lithium difluoro (bisoxalato) phosphate, or lithium tetrafluoro (oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethylsulfonyl) ethane.

In some embodiments, the electrolytic solution further optionally includes an additive. For example, the additive may include a negative film-forming additive or a positive film-forming additive. The additive may further include an additive capable of improving specified performance of the battery, for example, an additive for improving overcharge performance of the battery, or an additive for improving high- or low-temperature performance of the battery.

Separator

In some embodiments, the lithium-ion battery further includes a separator. The type of the separator is not particularly limited in this application, and may be any well-known porous separator that is highly stable both chemically and mechanically.

In some embodiments, the separator may be made of at least one selected from glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be made into an electrode assembly by winding or stacking.

In some embodiments, the lithium-ion battery may further include an outer package. The outer package may be configured to package the electrode assembly and the electrolyte.

In some embodiments, the outer package of the lithium-ion battery may be a hard shell such as a hard plastic shell, an aluminum shell, a steel shell, or the like. Alternatively, the outer package of the lithium-ion battery may be a soft package such as a pouch-type soft package. The soft package may be made of plastic such as polypropylene, polybutylene terephthalate, or polybutylene succinate.

Figure 2:
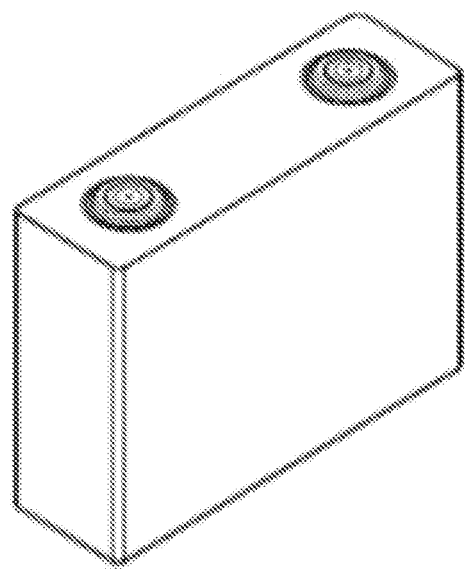
FIG. 2 is a schematic diagram of a lithium-ion battery according to an embodiment of this application.

The shape of the lithium-ion battery is not particularly limited in this application, and may be cylindrical, prismatic or any other shape. FIG. 2 shows a prismatic lithium-ion battery 5 as an example.

Figure 3:
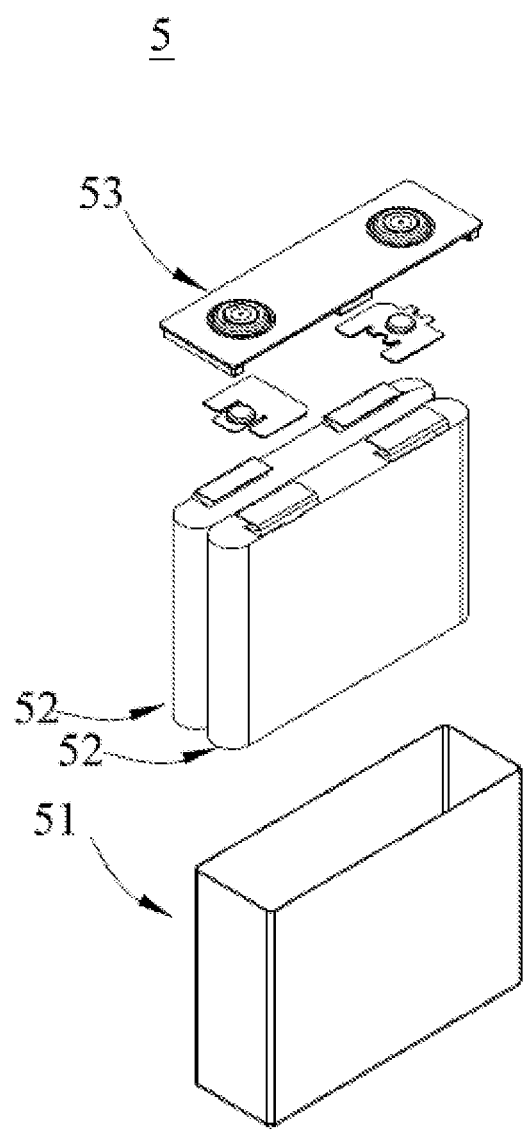
FIG. 3 is an exploded view of the lithium-ion battery shown in FIG. 2 according to an embodiment of this application.

In some embodiments, referring to FIG. 3, the outer package may include a housing 51 and a cover plate 53. The housing 51 may include a bottom plate and side plates connected to the bottom plate. The bottom plate and the side plates close in to form an accommodation cavity. An opening that communicates with the accommodation cavity is made on the housing 51. The cover plate 53 can fit and cover the opening to close the accommodation cavity. The positive electrode plate, the negative electrode plate, and the separator may be made into the electrode assembly 52 by winding or stacking. The electrode assembly 52 is packaged in the accommodation cavity. The electrolytic solution infiltrates in the electrode assembly 52. The number of electrode assemblies 52 in a lithium-ion battery 5 may be one or more, and may be selected by a person skilled in the art as actually required.

In some embodiments, the lithium-ion battery may be assembled into a battery module. The battery module may include one or more lithium-ion batteries, and the specific number of lithium-ion batteries in a battery module may be selected by a person skilled in the art depending on practical applications and capacity of the battery module.

Figure 4:
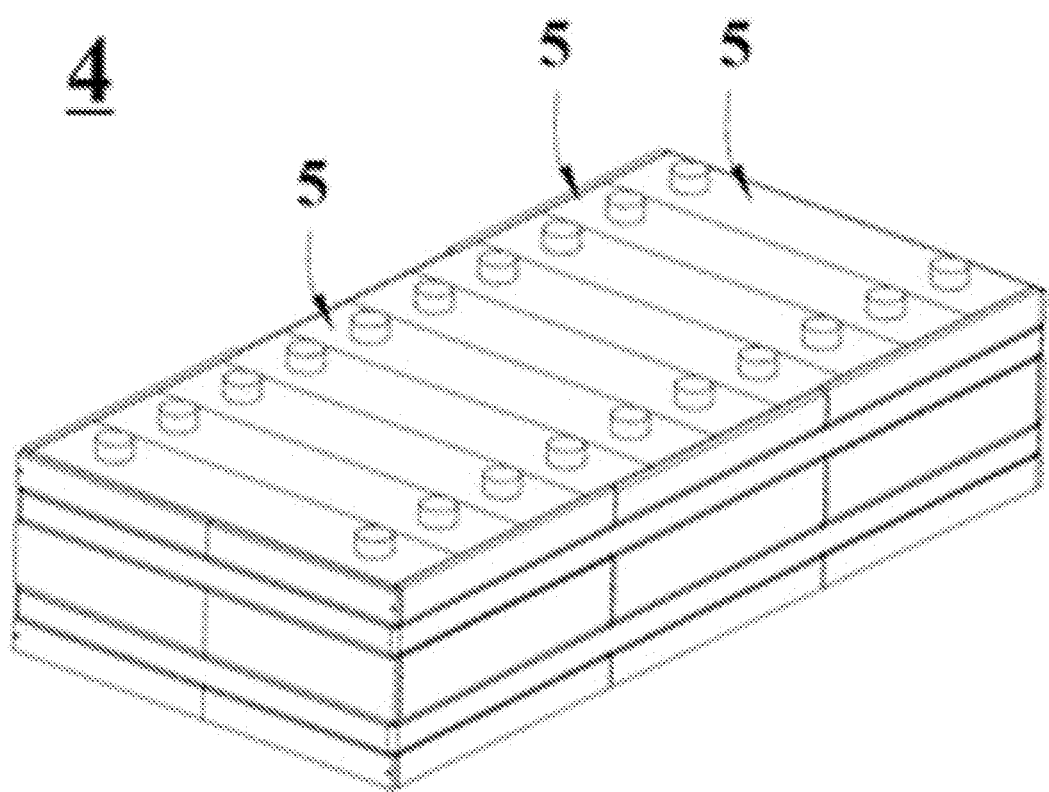
FIG. 4 is a schematic diagram of a battery module according to an embodiment of this application.

FIG. 3 shows a battery module 4 as an example. Referring to FIG. 4, in the battery module 4, a plurality of lithium-ion batteries 5 may be arranged sequentially along a length direction of the battery module 4. Alternatively, the secondary batteries may be arranged in any other manner. Further, the plurality of lithium-ion batteries 5 may be fixed by a fastener.

Optionally, the battery module 4 may further include a shell that provides an accommodation space. The plurality of lithium-ion batteries 5 are accommodated in the accommodation space.

In some embodiments, the battery modules may be assembled into a battery pack. The battery pack may include one or more battery modules, and the specific number of battery modules in a battery pack may be selected by a person skilled in the art depending on practical applications and capacity of the battery pack.

Figure 5:
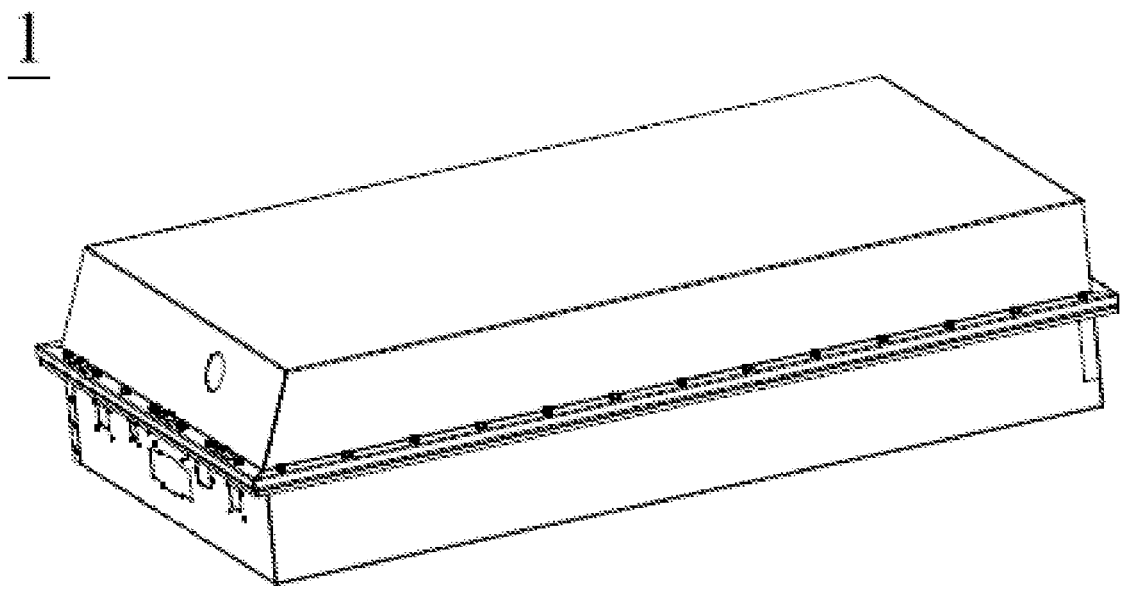
FIG. 5 is a schematic diagram of a battery pack according to an embodiment of this application.
Figure 6:
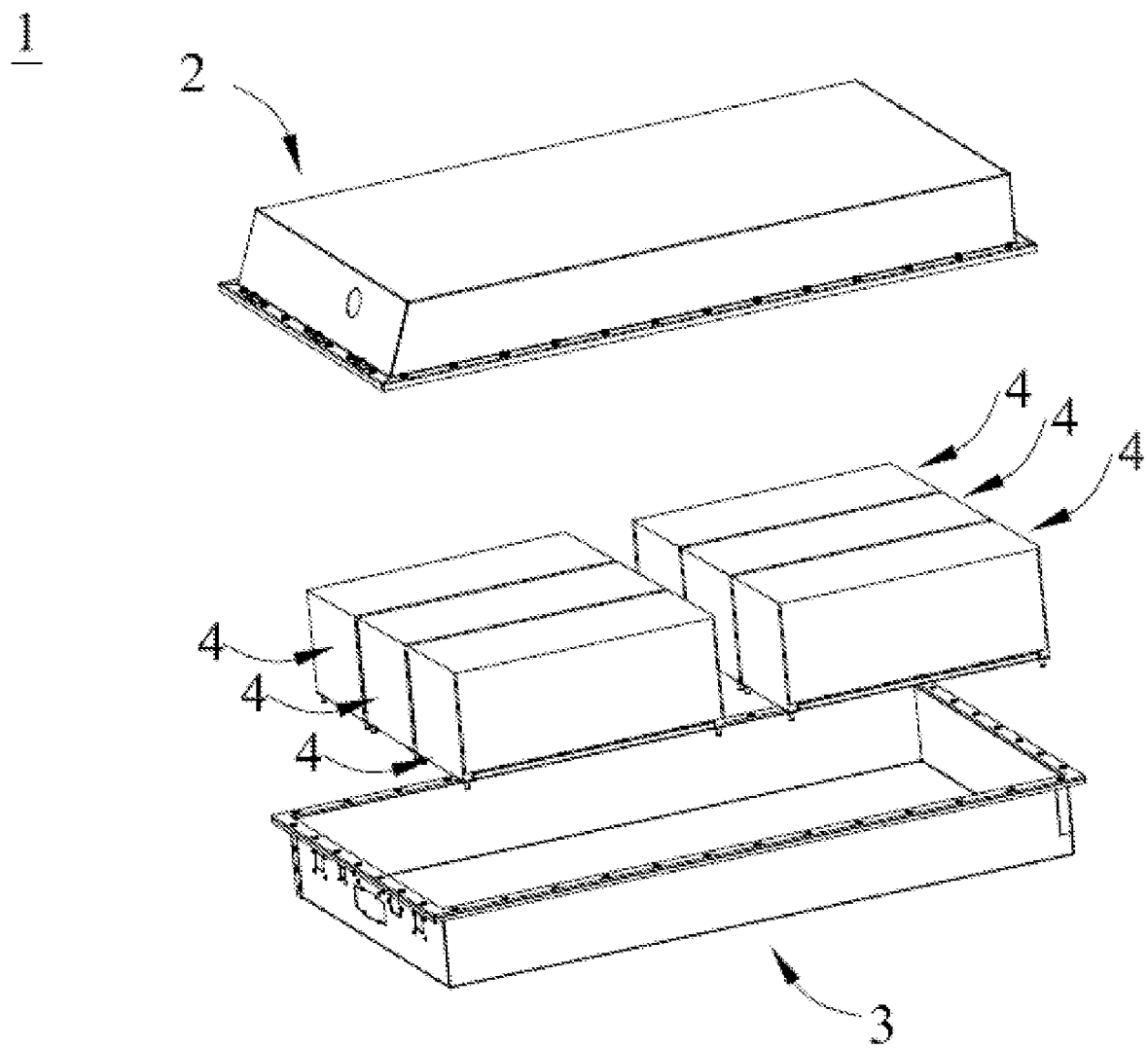
FIG. 6 is an exploded view of the battery pack shown in FIG. 5 according to an embodiment of this application.

FIG. 5 and FIG. 6 show a battery pack 1 as an example. Referring to FIG. 5 and FIG. 6, the battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this application provides an electrical device. The electrical device includes at least one of the lithium-ion battery, the battery module, or the battery pack according to this application. The lithium-ion battery, the battery module, or the battery pack may be used as a power supply of the electrical device, or used as an energy storage unit of the electrical device. The electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The lithium-ion battery, the battery module, or the battery pack may be selected for use in the electrical device according to practical requirements.

Figure 7:
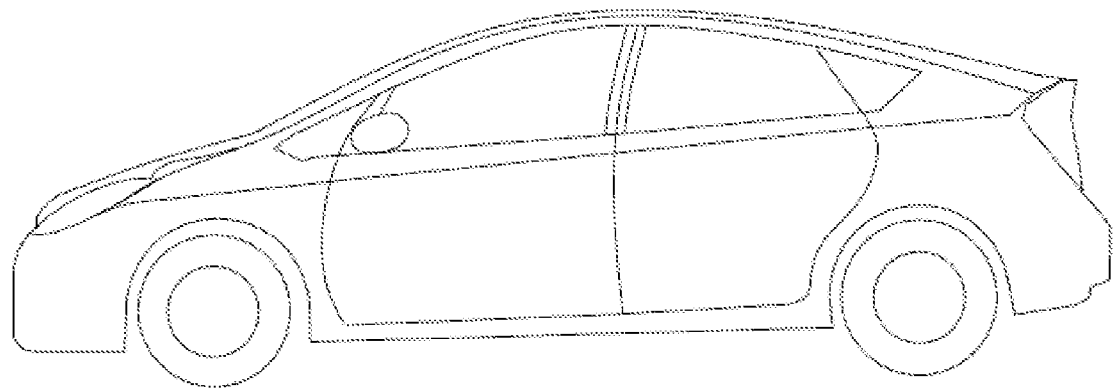
FIG. 7 is a schematic diagram of an electrical device that uses a lithium-ion battery as a power supply according to an embodiment of this application.

FIG. 7 shows an electrical device as an example. The electrical device may be a battery electric vehicle, a hybrid electric vehicle, a plug-in hybrid electric vehicle, or the like. To meet the requirements of the electrical device for a high power and a high energy density of the lithium-ion battery, a battery pack or a battery module may be used for the electrical device.

In another example, the device may be a mobile phone, a tablet computer, a notebook computer, or the like. The device is generally required to be thin and light, and may use a lithium-ion battery as a power supply.

EMBODIMENTS

The following describes embodiments of this application. The embodiments described below are illustrative, and are merely intended to construe this application but not to limit this application. In a case that no specific technique or condition is specified in an embodiment, the techniques or conditions described in the literature in this field or described in the instruction manual of the product may apply. A reagent or instrument used herein without specifying the manufacturer is a conventional product that is commercially available in the market.

Sources of raw materials involved in the embodiments of this application are as follows:
- Ethylenediaminetetraacetic acid (CAS: 60-00-4, Shanghai Aladdin Bio-Chem Technology Co., Ltd.)
- O-phenylenediamine (CAS: 95-54-5, Shanghai Aladdin Bio-Chem Technology Co., Ltd.)
- Ethylene glycol (CAS: 107-21-1, Shanghai Macklin Biotech Co., Ltd.)
- Anhydrous ethanol (CAS: 64-17-5, Shanghai Macklin Biotech Co., Ltd.)
- Acetone (CAS: 598-31-2, Shanghai Aladdin Bio-Chem Technology Co., Ltd.)
- Potassium hydroxide (CAS: 1310-58-3, Shanghai Macklin Biotech Co., Ltd.)
- Bromoethane (CAS: 74-96-4, Shanghai Aladdin Bio-Chem Technology Co., Ltd.)
- Dimethyl sulfoxide (CAS: 67-68-5, Shanghai Aladdin Bio-Chem Technology Co., Ltd.)
- Lithium nickel cobalt manganese oxide ($LiNi_{0.5}Co_{0.2}Mn_{0.3}O_2$, NCM523, Ningbo Jinhe New Materials Co., Ltd.)
- Artificial graphite (Qingdao Lianchuang Lida Graphite Co., Ltd.)
- Acetylene black (ACET, CAS: 1333-86-4, Qingdao Lianchuang Lida Graphite Co., Ltd.)
- N-methyl-pyrrolidone (NMP, CAS: 872-50-4, Shanghai Aladdin Bio-Chem Technology Co., Ltd.)
- Polyvinylidene difluoride (PVDF, CAS: 24937-79-9, Shanghai Aladdin Bio-Chem Technology Co., Ltd.)
- Polymethyl methacrylate (PMMA, CAS: 9011-14-7, Shanghai Aladdin Bio-Chem Technology Co., Ltd.)
- Ethylene carbonate (EC, CAS: 96-49-1, Shanghai Macklin Biotech Co., Ltd.)
- Ethyl methyl carbonate (EMC, CAS: 623-53-0, Shanghai Macklin Biotech Co., Ltd.)
- Lithium hexafluorophosphate ($LiPF_6$, CAS: 21324-40-3, Guangzhou Tinci Materials Technology Co., Ltd.)
- Lithium bisfluorosulfonimide (LIFSI, CAS: 171611 November 3, Guangzhou Tinci Materials Technology Co., Ltd.)
- Carbon black (Guangdong Kaijin New Energy Technology Co., Ltd.)
- Acrylate (CAS: 25067 February 1, Shanghai Macklin Biotech Co., Ltd.)

I. Preparing a Lithium-Ion Battery

Embodiment 1

1) Preparing a Positive Electrode Additive EDTB

Adding ethylenediaminetetraacetic acid and o-phenylenediamine into a conical flask with a reflux unit at a molar ratio of 1:4, and then adding a solvent ethylene glycol. Keeping refluxing at 160° C. for 8 hours to obtain a red liquid. Slowly adding distilled water into the flask of the red liquid that has been cooled down, and leaving the liquid to clump at the bottom layer. Cooling the liquid to a room temperature, and then adding anhydrous ethanol, leaving the liquid to stand for 12 hours, and filtering the liquid. Adding ethanol to recrystallize and obtain a solid, and rinsing the solid with a small amount of acetone. Drying under a vacuum condition to obtain a white EDTB solid.

2) Preparing a Positive Electrode Slurry

Mixing EDTB, lithium nickel cobalt manganese oxide ($LiNi_{0.5}Co_{0.2}Mn_{0.3}O_2$, NCM523), a dispersant polymethyl methacrylate (PMMA), a binder polyvinylidene difluoride (PVDF), a conductive agent acetylene black (ACET), and a solvent N-methyl-pyrrolidone (NMP) in a drying room at a weight ratio of 0.90:65:0.07:0.80:1.23:32 to make a slurry.

3) Preparing a Lithium-Ion Battery

Preparing an Electrolytic Solution

Adding 32.64 grams of EC, 60.84 grams of EMC, 6.25 grams of $LiPF_6$, and 0.15 gram of LiFSI into a beaker in an argon atmosphere glovebox in which the moisture content is less than 10 ppm. Stirring well and dissolving the components to obtain an electrolytic solution ready for use in an embodiment.

Preparing a Positive Electrode Plate

Coating a 13-μm-thick positive current collector aluminum foil evenly with the positive electrode slurry obtained in step 2), in an amount of 0.28 gram (dry)/1540.25 mm². Air-drying the aluminum foil at a room temperature, and then moving the aluminum foil into a 120° C. oven to dry for 1 hour, and performing cold-calendering and slitting to obtain a positive electrode plate.

Preparing a Negative Electrode Plate

Mixing artificial graphite, a conductive agent carbon black, and a binder acrylate at a weight ratio of 92:2:6, and adding deionized water. Stirring the mixture with a vacuum mixer to obtain a negative electrode slurry. Coating an 8-μm-thick negative current collector copper foil with the negative electrode slurry evenly in an amount of 0.18 g (dry)/1540.25 mm². Air-drying the copper foil under a room temperature, and then moving the copper foil into a 120° C. oven to dry for 1 hour, and performing cold-calendering and slitting to obtain a negative electrode plate.

[Separator]

The separator is Cellgard 2400 purchased from Cellgard.

Preparing a Lithium-Ion Battery

Stacking the positive electrode plate, the separator, and the negative electrode plate in sequence, letting the separator be located between the positive electrode plate and the negative electrode plate to serve a separation function, winding the stacked structure to obtain a bare cell, placing the bare cell of a 4.3 Ah capacity into an outer package foil, injecting 8.6 grams of the electrolytic solution prepared above into the cell that has been dried, and performing steps such as vacuum packaging, standing, chemical formation, and shaping to obtain a lithium-ion battery.

Embodiment 2

1) Preparing a Positive Electrode Additive Represented by Formula (I-1)

Mixing potassium hydroxide, EDTB, and dimethyl sulfoxide at a molar ratio of 15:1:0.2, and then slowly adding bromoethane (the molar ratio between bromoethane and EDTB is 4:1), and stirring the mixture at 25° C. for 2 hours. Adding distilled water, continuing to stir for 0.5 hour, leaving the mixture to stand for 1 hour, and performing filtering, washing, and drying to obtain a crude product. Recrystallizing by using anhydrous ethanol, so as to obtain solid powder represented by Formula (I-1).

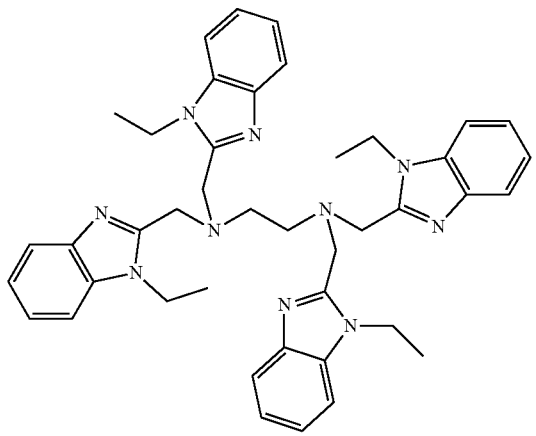

(I-1)

This embodiment is identical to Embodiment 1 except that the positive electrode additive represented by Formula (I-1) is used in the step "2) Preparing a positive electrode slurry".

Embodiment 3

Using the positive electrode additive represented by Formula (I-2) and purchased from Shanghai Macklin Biotech Co., Ltd.

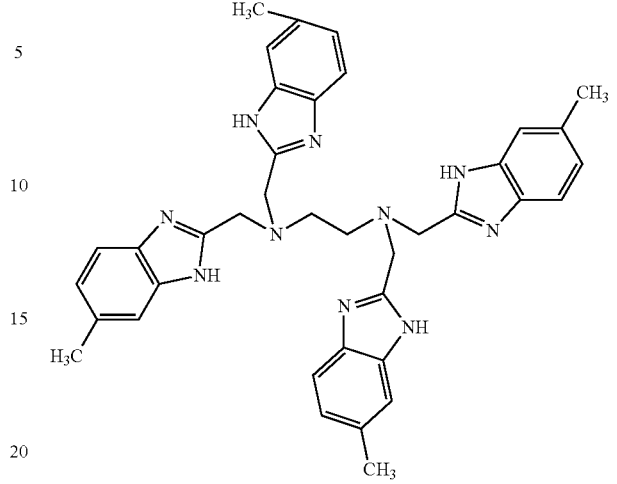

(I-2)

This embodiment is identical to Embodiment 1 except that the positive electrode additive represented by Formula (1-2) is used in the step "2) Preparing a positive electrode slurry".

Embodiment 4

Using the positive electrode additive represented by Formula (I-3) and purchased from Shanghai Macklin Biotech Co., Ltd.

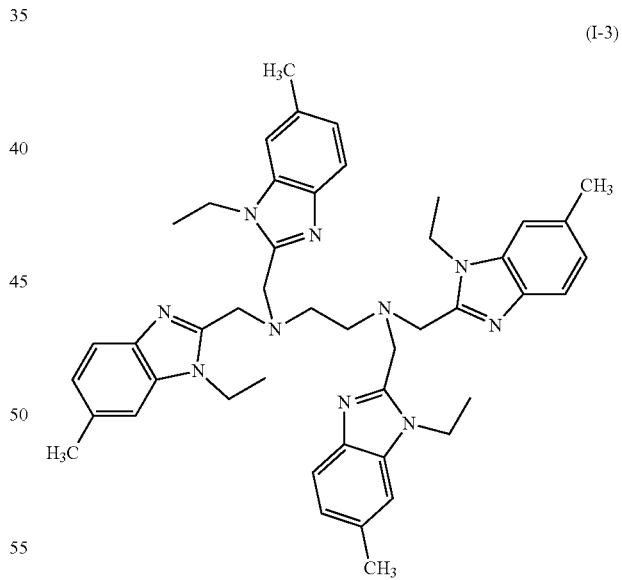

(I-3)

This embodiment is identical to Embodiment 1 except that the positive electrode additive represented by Formula (1-3) is used in the step "2) Preparing a positive electrode slurry".

Embodiment 5

Identical to Embodiment 1 except that the EDTB, NCM523, PMMA, PVDF, ACET, and NMP are mixed at a weight ratio of 0.05:50:0.05:0.62:0.95:48.33 in step "2) Preparing a positive electrode slurry".

Embodiment 6

Identical to Embodiment 1 except that the EDTB, NCM523, PMMA, PVDF, ACET, and NMP are mixed at a weight ratio of 0.06:55:0.06:0.68:1.04:43.16 in step "2) Preparing a positive electrode slurry".

Embodiment 7

Identical to Embodiment 1 except that the EDTB, NCM523, PMMA, PVDF, ACET, and NMP are mixed at a weight ratio of 0.50:70:0.08:0.86:1.32:27.24 in step "2) Preparing a positive electrode slurry".

Embodiment 8

Identical to Embodiment 1 except that the EDTB, NCM523, PMMA, PVDF, ACET, and NMP are mixed at a weight ratio of 0.90:70:0.08:0.86:1.32:26.84 in step "2) Preparing a positive electrode slurry".

Embodiment 9

Identical to Embodiment 1 except that the EDTB, NCM523, PMMA, PVDF, ACET, and NMP are mixed at a weight ratio of 1.0:70:0.08:0.86:1.32:26.74 in step "2) Preparing a positive electrode slurry".

Embodiment 10

Identical to Embodiment 1 except that the EDTB, NCM523, PMMA, PVDF, ACET, and NMP are mixed at a weight ratio of 1.60:65.00:0.07:0.80:1.23:31.30 in step "2) Preparing a positive electrode slurry".

Embodiment 11

Identical to Embodiment 1 except that the EDTB, NCM523, PMMA, PVDF, ACET, and NMP are mixed at a weight ratio of 1.50:70:0.08:0.86:1.32:26.24 in step "2) Preparing a positive electrode slurry".

Embodiment 12

Identical to Embodiment 1 except that the EDTB, NCM523, PMMA, PVDF, ACET, and NMP are mixed at a weight ratio of 1.50:55:0.06:0.68:1.04:41.72 in step "2) Preparing a positive electrode slurry".

Embodiment 13

Identical to Embodiment 1 except that the EDTB, NCM523, PMMA, PVDF, ACET, and NMP are mixed at a weight ratio of 1.40:60:0.06:0.74:1.14:36.66 in step "2) Preparing a positive electrode slurry".

Embodiment 14

Identical to Embodiment 1 except that the EDTB, NCM523, PMMA, PVDF, ACET, and NMP are mixed at a weight ratio of 1.00:60:0.06:0.74:1.14:37.06 in step "2) Preparing a positive electrode slurry".

Embodiment 15

Identical to Embodiment 1 except that the EDTB, NCM523, PMMA, PVDF, ACET, and NMP are mixed at a weight ratio of 0.60:60:0.06:0.74:1.14:37.46 in step "2) Preparing a positive electrode slurry".

Embodiment 16

Identical to Embodiment 1 except that the EDTB, NCM523, PMMA, PVDF, ACET, and NMP are mixed at a weight ratio of 0.30:60:0.06:0.74:1.14:37.76 in step "2) Preparing a positive electrode slurry".

Embodiment 17

Identical to Embodiment 1 except that the EDTB, NCM523, PMMA, PVDF, ACET, and NMP are mixed at a weight ratio of 0.08:75:0.08:0.92:1.42:22.50 in step "2) Preparing a positive electrode slurry".

Embodiment 18

Identical to Embodiment 1 except that the EDTB, NCM523, PMMA, PVDF, ACET, and NMP are mixed at a weight ratio of 0.06:73:0.08:0.90:1.38:24.58 in step "2) Preparing a positive electrode slurry".

Comparative Embodiment 1

The lithium-ion battery is prepared in the same way as in Embodiment 1 except that the positive electrode additive according to this application is not included at all during preparation of the positive electrode slurry.

II. Testing Battery Performance

1. Testing 45° C. Cycle Performance

Charging a battery at a constant current of 1 C under a 45° C. temperature until the voltage reaches 4.3 V, and then charging the battery at a constant voltage of 4.3 V until the current reaches 0.05 C. Leaving the battery to stand for 5 minutes, and then discharging the battery at a constant current of 1 C until the voltage reaches 2.8 V. Recording the capacity at this time as an initial capacity $C_0$. Repeating the foregoing steps for the same battery, and starting counting the number of cycles at the same time. Recording the discharge capacity $C_{1000}$ of the battery at the end of the $1000^{th}$ cycle. Calculating the cycle capacity retention rate of the battery at the end of 1000 cycles according to a formula: $P=C_{1000}/C_0\times100\%$.

Testing the lithium-ion batteries of the embodiments and the comparative embodiments separately according to the foregoing process. The specific parameter values are shown in Table 1 to Table 3.

2. Testing 60° C. Storage Performance

Charging a battery at a constant current of 1 C under a 25° C. temperature until the voltage reaches 4.3 V, and then charging the battery at a constant voltage of 4.3 V until the current reaches 0.05 C. Leaving the battery to stand for 5 minutes, and then discharging the battery at a constant current of 0.5 C until the voltage reaches 2.5 V. Recording the discharge capacity at this time as an initial capacity $C_0$.

Charging the battery again at a constant current of 1 C until the voltage reaches 4.3 V, and then charging the battery at a constant voltage of 4.3 V until the current reaches 0.05 C. Putting the battery into a 60° C. thermostat, keeping the battery stored for 270 days, and then taking it out. Placing the battery in an atmospheric environment of 25° C. Discharging, after the temperature of the lithium-ion battery drops to 25° C., the lithium-ion battery at a constant current of 1 C until the voltage reaches 2.8 V, and then charging the battery again at a constant current of 1 C until the voltage reaches 4.3 V. Finally, discharging the lithium-ion battery at a constant current of 0.05 C until the voltage reaches 2.8 V. Recording the discharge capacity at this time as $C_1$. After 270 days of storage, the high-temperature storage capacity retention rate of the battery is $M=C_1/C_0 \times 100\%$.

Testing the batteries of other embodiments and comparative embodiments separately according to the foregoing process. The specific parameter values are shown in Table 1 to Table 3.

TABLE 1

Effect of positive electrode additive on battery

| | Relevant parameters of positive electrode slurry | | | | Weight ratio between manganese-containing positive active material and positive electrode additive | Battery performance | |
|---|---|---|---|---|---|---|---|
| | Positive electrode additive | | Manganese-containing positive active material | | | 45° C. cycle | 60° C. storage |
| Embodiment | Type | Weight percentage (wt %) | Type | Weight percentage (wt %) | | capacity retention rate P (%) | capacity retention rate M (%) |
| 1 | EDTB | 0.90 | NCM523 | 65 | 72 | 93.0 | 96.1 |
| 2 | Formula (I-1) | 0.90 | NCM523 | 65 | 72 | 91.0 | 94.0 |
| 3 | Formula (I-2) | 0.90 | NCM523 | 65 | 72 | 92.8 | 96.0 |
| 4 | Formula (I-3) | 0.90 | NCM523 | 65 | 72 | 92.7 | 95.9 |
| Comparative Embodiment 1 | No positive electrode additive according to this application | 0 | NCM523 | 65 | / | 80.0 | 84.0 |
| Remarks | The weight percentage of the positive electrode additive and the positive active material is based on the total weight of the positive electrode slurry. | | | | | | |

TABLE 2

Effect of weight percentage of positive electrode additive on battery performance

| | Relevant parameters of positive electrode slurry | | | | Weight ratio between manganese-containing positive active material and positive electrode additive | Battery performance | |
|---|---|---|---|---|---|---|---|
| | Positive electrode additive | | Manganese-containing positive active material | | | 45° C. cycle | 60° C. storage |
| Embodiment | Type | Weight percentage (wt %) | Type | Weight percentage (wt %) | | capacity retention rate P (%) | capacity retention rate M (%) |
| 5 | EDTB | 0.05 | NCM523 | 50 | 1000 | 84.5 | 88.6 |
| 6 | EDTB | 0.06 | NCM523 | 55 | 917 | 89.7 | 92.7 |
| 7 | EDTB | 0.50 | NCM523 | 70 | 140 | 91.8 | 94.8 |
| 8 | EDTB | 0.90 | NCM523 | 70 | 78 | 92.9 | 95.9 |
| 9 | EDTB | 1.00 | NCM523 | 70 | 70 | 92.0 | 95.0 |
| 10 | EDTB | 1.60 | NCM523 | 65 | 41 | 85.7 | 89.8 |
| 11 | EDTB | 1.50 | NCM523 | 70 | 47 | 89.9 | 92.9 |
| Remarks | The weight percentage of the positive electrode additive and the positive active material is based on the total weight of the positive electrode slurry. | | | | | | |

TABLE 3

Effect of weight ratio between manganese-containing positive active material and positive electrode additive on battery performance

| | Relevant parameters of positive electrode slurry | | | | Weight ratio between manganese-containing positive active material and positive electrode additive | Battery performance | |
|---|---|---|---|---|---|---|---|
| | Positive electrode additive | | Manganese-containing positive active material | | | 45° C. cycle | 60° C. storage |
| Embodiment | Type | Weight percentage (wt %) | Type | Weight percentage (wt %) | | capacity retention rate P (%) | capacity retention rate M (%) |
| 12 | EDTB | 1.50 | NCM523 | 55 | 37 | 85.9 | 89.0 |
| 13 | EDTB | 1.40 | NCM523 | 60 | 43 | 90.1 | 93.1 |
| 14 | EDTB | 1.00 | NCM523 | 60 | 60 | 92.0 | 95.0 |

TABLE 3-continued

Effect of weight ratio between manganese-containing positive active material and positive electrode additive on battery performance

| | Relevant parameters of positive electrode slurry | | | | Weight ratio between | Battery performance | |
|---|---|---|---|---|---|---|---|
| | Positive electrode additive | | Manganese-containing positive active material | | manganese-containing positive active material and positive electrode additive | 45° C. cycle capacity retention rate P (%) | 60° C. storage capacity retention rate M (%) |
| Embodiment | Type | Weight percentage (wt %) | Type | Weight percentage (wt %) | | | |
| 15 | EDTB | 0.60 | NCM523 | 60 | 100 | 92.1 | 95.1 |
| 16 | EDTB | 0.30 | NCM523 | 60 | 200 | 91.0 | 93.6 |
| 17 | EDTB | 0.08 | NCM523 | 75 | 938 | 89.3 | 92.3 |
| 18 | EDTB | 0.06 | NCM523 | 73 | 1217 | 85.7 | 88.6 |
| Remarks | The weight percentage of the positive electrode additive and the positive active material is based on the total weight of the positive electrode slurry. | | | | | | |

As can be seen from the test results above, all of Embodiments 1 to 18 have achieved good results. In contrast to the comparative embodiment, the positive electrode slurry according to this application can prolong the service life of the lithium-manganese-oxide-based lithium-ion batteries and improve the high-temperature cycle performance and high-temperature storage performance of the batteries.

It is hereby noted that this application is not limited to the foregoing embodiments. The foregoing embodiments are merely examples. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

The invention claimed is:

1. A positive electrode slurry, comprising:
a manganese-containing positive active material; and
a positive electrode additive, the positive electrode additive includes a compound represented by Formula (I):

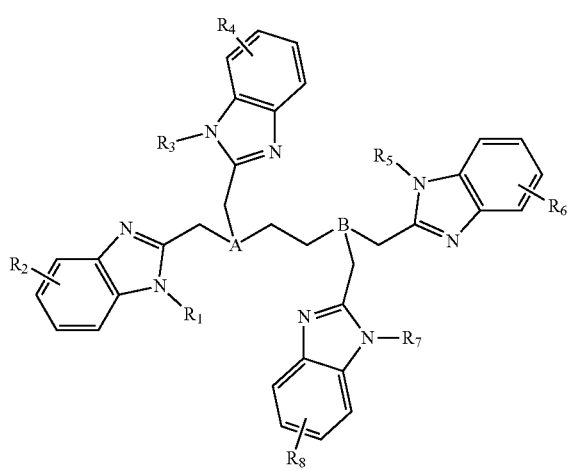

Formula (I)

wherein:
A is atom N and B is atom N; and
at least one of $R_2$, $R_4$, $R_6$, or $R_8$ is an alkyl with a carbon number of 1-7, and remaining ones of $R_1$, $R_2$, $R_3$, $R_4$, $R_5$, $R_6$, $R_7$, and $R_8$ other than the at least one of $R_2$, $R_4$, $R_6$, or $R_8$ are, each independently, selected from hydrogen or an alkyl with a carbon number of 1-7.

2. The positive electrode slurry according to claim 1, wherein, in the positive electrode additive represented by Formula (I), at least one of $R_2$, $R_4$, $R_6$, or $R_8$ is an alkyl with a carbon number of 1-3, and remaining ones of $R_1$, $R_2$, $R_3$, $R_4$, $R_5$, $R_6$, $R_7$, and $R_8$ other than the at least one of $R_2$, $R_4$, $R_6$, or $R_8$ are, each independently, selected from hydrogen or an alkyl with a carbon number of 1-3.

3. The positive electrode slurry according to claim 1, wherein a weight percentage of the positive electrode additive is 0.06 wt % to 1.5 wt % of a total weight of the positive electrode slurry.

4. The positive electrode slurry according to claim 1, wherein a weight percentage of the positive electrode additive is 0.5 wt % to 1 wt % of a total weight of the positive electrode slurry.

5. The positive electrode slurry according to claim 1, wherein a weight ratio between the manganese-containing positive active material and the positive electrode additive is 40:1 to 1000:1.

6. The positive electrode slurry according to claim 1, wherein a weight ratio between the manganese-containing positive active material and the positive electrode additive is 60:1 to 200:1.

7. The positive electrode slurry according to claim 1, wherein:
the manganese-containing positive active material is at least one selected from lithium manganese oxide, lithium manganese cobalt oxide, lithium aluminum manganese oxide, lithium nickel manganese oxide, lithium nickel cobalt manganese oxide, or a modified compound thereof; and
a weight percentage of the manganese-containing positive active material is 50 wt % to 75 wt % of a total weight of the positive electrode slurry.

8. The positive electrode slurry according to claim 1, wherein:
the positive electrode slurry comprises a binder;
the binder is at least one selected from styrene, acrylate, vinyl acetate, fatty acid vinyl ester, epoxy resin, linear polyester, polyvinylidene fluoride, polystyrene, polysulfide rubber, polyacrylic acid, polyacrylate, polyurethane, polyisobutylene, polyvinyl alcohol, polyimide, polyacrylonitrile, polyethylene oxide, polyvinylpyrrolidone, styrene butadiene rubber, or gelatin; and
a weight percentage of the binder is 0.5 wt % to 1 wt % of a total weight of the positive electrode slurry.

9. The positive electrode slurry according to claim 1, wherein:
the positive electrode slurry comprises a conductive agent;
the conductive agent is at least one selected from superconductive carbon, acetylene black, carbon black, Ketjen black, carbon dots, carbon nanotubes, graphene, or carbon nanofibers; and
a weight percentage of the conductive agent is 0.9 wt % to 1.5 wt % of a total weight of the positive electrode slurry.

10. The positive electrode slurry according to claim 1, further comprising:
a dispersant, the dispersant being at least one selected from polymethyl methacrylate, polyethylene glycol, polyvinylpyrrolidone, sodium linear alkylbenzene sulfonate, alkyl polyoxyethylene ether, sodium lauryl sulfate, or alkyl sulfonate;
wherein a weight percentage of the dispersant is 0.05 wt % to 0.1 wt % of a total weight of the positive electrode slurry.

11. A positive electrode plate, comprising:
a positive current collector; and
a positive film layer disposed on at least one surface of the positive current collector, the positive film layer containing a positive electrode slurry comprising:
a manganese-containing positive active material; and
a positive electrode additive, the positive electrode additive includes a compound represented by Formula (I):

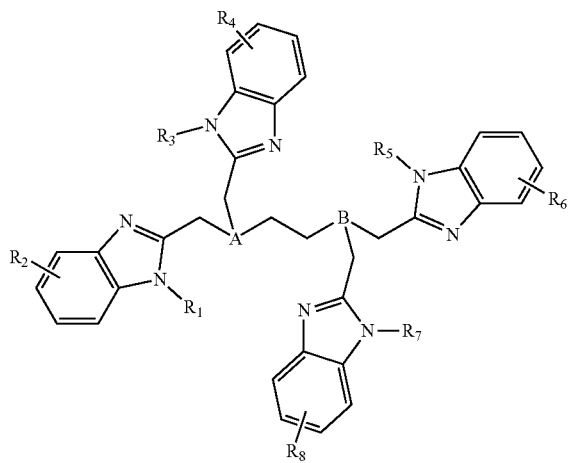

Formula (I)

wherein:
A is atom N and B is atom N; and
at least one of $R_2$, $R_4$, $R_6$, or $R_8$ is an alkyl with a carbon number of 1-7, and remaining ones of $R_1$, $R_2$, $R_3$, $R_4$, $R_5$, $R_6$, $R_7$, and $R_8$ other than the at least one of $R_2$, $R_4$, $R_6$, or $R_8$ are, each independently, selected from hydrogen or an alkyl with a carbon number of 1-7.

12. A lithium-ion battery, comprising:
a positive electrode plate comprising:
a positive current collector; and
a positive film layer disposed on at least one surface of the positive current collector, the positive film layer containing a positive electrode slurry comprising:
a manganese-containing positive active material; and
a positive electrode additive, the positive electrode additive includes a compound represented by Formula (I):

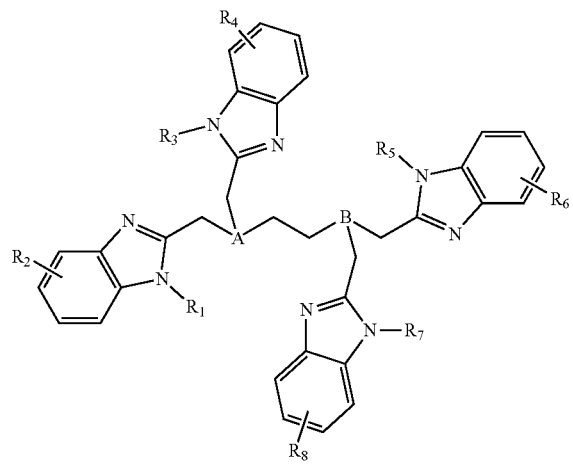

Formula (I)

wherein:
A is atom N and B is atom N; and
at least one of $R_2$, $R_4$, $R_6$, or $R_8$ is an alkyl with a carbon number of 1-7, and remaining ones of $R_1$, $R_2$, $R_3$, $R_4$, $R_5$, $R_6$, $R_7$, and $R_8$ other than the at least one of $R_2$, $R_4$, $R_6$, or $R_8$ are, each independently, selected from hydrogen or an alkyl with a carbon number of 1-7.

13. A battery module, comprising the lithium-ion battery according to claim 12.

14. A battery pack, comprising the battery module according to claim 13.

15. An electrical device, comprising the lithium-ion battery according to claim 12.

* * * * *